(12) United States Patent
Robinson

(10) Patent No.: US 9,118,487 B1
(45) Date of Patent: Aug. 25, 2015

(54) ASYMMETRIC ENCRYPTION SCHEME WITH EXPIRING REVOCABLE CERTIFICATES HAVING A PREDEFINED VALIDITY PERIOD

(71) Applicant: EMC Corporation, Hopkinton, MA (US)

(72) Inventor: Peter Robinson, Enoggera Reservoir (AU)

(73) Assignee: EMC Corporation, Hopkinton, MA (US)

( * ) Notice: Subject to any disclaimer, the term of this patent is extended or adjusted under 35 U.S.C. 154(b) by 62 days.

(21) Appl. No.: 13/931,167

(22) Filed: Jun. 28, 2013

(51) Int. Cl.
*H04L 29/06* (2006.01)
*H04L 9/32* (2006.01)

(52) U.S. Cl.
CPC .......... *H04L 9/3268* (2013.01); *H04L 63/0442* (2013.01)

(58) Field of Classification Search
CPC . H04L 2209/80; H04L 2209/84; H04L 9/006; H04L 9/08; H04L 9/0891; H04L 9/30; H04L 9/3268; H04L 9/3294; H04L 2209/30; H04L 2209/38; H04L 9/3247

USPC .............. 713/158, 175, 176; 726/1, 2, 14; 709/229

See application file for complete search history.

(56) References Cited

U.S. PATENT DOCUMENTS

| | | | |
|---|---|---|---|
| 7,827,401 B2* | 11/2010 | Micali ........................... | 713/158 |
| 8,397,063 B2* | 3/2013 | DiCrescenzo ................ | 713/158 |
| 8,423,761 B2* | 4/2013 | Guo et al. ..................... | 713/156 |
| 8,468,340 B2* | 6/2013 | Moore et al. .................. | 713/156 |
| 2012/0290460 A1* | 11/2012 | Curry et al. ..................... | 705/37 |

* cited by examiner

*Primary Examiner* — Thanhnga B Truong
(74) *Attorney, Agent, or Firm* — Ryan, Mason & Lewis, LLP

(57) ABSTRACT

Methods and apparatus are provided for an asymmetric encryption scheme with expiring revocable certificates having a predefined validity period. Communications between two devices are secured by obtaining an expiring revocable certificate; and securing said communicating with said expiring revocable certificate using asymmetric encryption. A prior expiring revocable certificate can be revoked when a new expiring revocable certificate is issued to at least one device. The expiring revocable certificate has a predefined validity period (based, for example, on a longest expected connection drop-out duration). A new expiring revocable certificate is requested at least once for each predefined revocation period. The expiring revocable certificate is revoked after the predefined revocation period, for example, only if a connection between the two devices is maintained.

20 Claims, 3 Drawing Sheets

ASYMMETRIC ENCRYPTION SCHEME WITH EXPIRING REVOCABLE CERTIFICATES HAVING A PREDEFINED VALIDITY PERIOD

FIELD

The present invention relates generally to security techniques for securing communications over a network or in other types of communication systems, and more particularly to asymmetric encryption techniques.

BACKGROUND

In order to secure communications between two entities, asymmetric encryption is often employed. In an asymmetric encryption system, a public key and a complementary private key are employed for each user. The public key is published and the private key is kept private. A sender uses the recipient's public key to encrypt a message and the recipient uses its own private key to decrypt the message.

When two entities are connected over a channel secured by asymmetric cryptography, such as a Transport Layer Security (TLS) link, the credentials of one entity could be stolen by an attacker, and then used by the attacker to setup another secure connection with the server. This is particularly problematic when one entity is a virtual machine (VM) on the public cloud.

A need therefore exists for methods and apparatus for asymmetric encryption with expiring revocable certificates having a predefined validity period. A further need exists for improved techniques for providing credentials to clients on the public cloud, such as a virtual machine. Yet another need exists for methods and apparatus for asymmetric encryption that are resilient to connection losses between the server and client.

SUMMARY

Generally, methods and apparatus are provided for an asymmetric encryption scheme with expiring revocable certificates having a predefined validity period. According to one aspect of the invention, communications between two devices are secured by obtaining an expiring revocable certificate; and securing said communicating with said expiring revocable certificate using asymmetric encryption. A prior expiring revocable certificate can be revoked when a new expiring revocable certificate is issued to at least one device.

According to one aspect of the invention, the expiring revocable certificate has a predefined validity period. The predefined validity period is determined based, for example, on a longest expected connection drop-out duration. The expiring revocable certificate remains valid for the predefined validity period if a connection between said two devices is lost.

According to a further aspect of the invention, at least one of the devices requests a new expiring revocable certificate at least once for each predefined revocation period. The predefined revocation period is determined, for example, based on an expected time for an attacker to obtain the expiring revocable certificate and the expiring revocable certificate to establish another connection. The expiring revocable certificate is revoked after the predefined revocation period, for example, only if a connection between the two devices is maintained.

The asymmetric encryption techniques of the illustrative embodiments overcome one or more of the problems associated with the conventional techniques described previously, and provide improved security by providing improved techniques for asymmetric encryption with expiring revocable certificates. Moreover, no modification of the applications or communication protocols is required. These and other features and advantages of the present invention will become more readily apparent from the accompanying drawings and the following detailed description.

DETAILED DESCRIPTION

Figure 1:
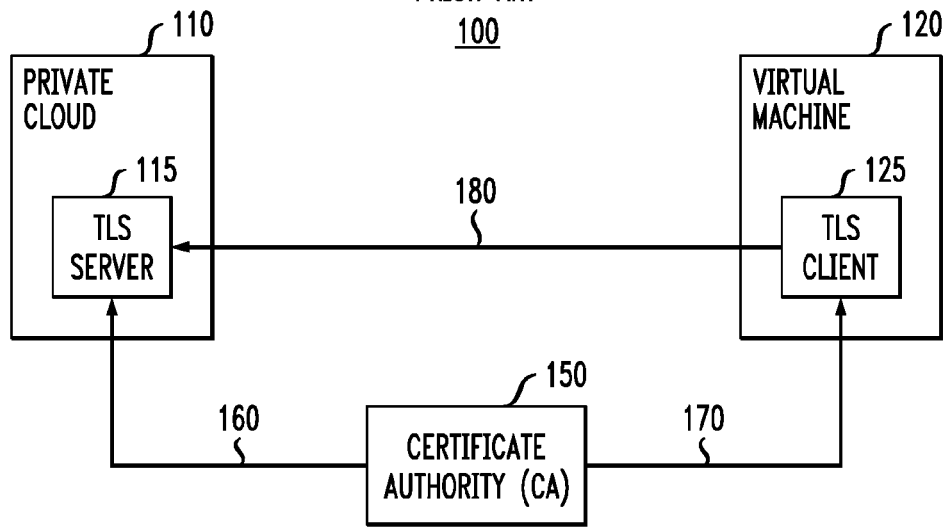
FIG. 1 shows a simplified network-based communication system where two entities are connected over a channel secured by conventional asymmetric encryption techniques.

The present invention will be described herein with reference to an example network-based communication system in which a client (for example, a client executing on a virtual machine on a public cloud) communicates over a network with one or more servers (for example, on a private cloud). It is to be appreciated, however, that the invention is not restricted to use in this or any other particular system configuration. Moreover, the phrases "computing system" and "data storage system" as used herein are intended to be broadly construed, so as to encompass, for example, private or public cloud computing or storage systems, as well as other types of systems comprising distributed virtual infrastructure.

Aspects of the present invention provide an improved asymmetric encryption scheme with expiring revocable certificates (such as public-key infrastructure (PKI) certificates) having a predefined validity period. According to one aspect of the invention, an asymmetric encryption scheme employs revocable certificates having a specified validity period for enhanced security, for example, in the Public Cloud. In one exemplary implementation, expiring revocable certificates are provided, such that if the credentials are obtained by an attacker, the credentials have expired or been revoked before they can be used by the attacker to setup another secure connection. For example, the expiring revocable certificates can have a predefined validity period of one hour, and the client could request a new certificate every minute. The server revokes the prior certificate when the new certificate is issued to the client.

According to another aspect of the invention, if the connection between the client and the server is lost, such that the client cannot request a new certificate, the prior certificate remains valid until the predefined validity period has expired. In this manner, resilience is provided when the channel connecting the two entities is lost, sometimes for multiple minutes.

In one exemplary implementation, the expiring revocable certificates have a validity period that is longer than the longest expected connection drop-out. Generally, the validity period of the certificate should be set at a value that reflects how long a client should be able to be out of contact with the server and still be able to reconnect. In addition, the frequency with which the client requests a new client certificate, i.e., the time between certificate revocations (referred to herein as the revocation period) should be less than an expected time that it would take an attacker to obtain the credentials from the client and use them to setup another secure connection with the server. For example, a revocation period of one minute between revocations is an appropriate value given the current state of the art.

Appropriate values for the validity period and the revocation period will depend, for example, on network characteristics and customer comfort level.

If the connection between the client and the server is up, but the client has not requested a new certificate within the pre-defined revocation period, the current certificate is revoked by the certificate authority. If an attacker steals the certificate when there is a connection between the client and the server, the certificate will be revoked before the attacker can effectively use it to create a new connection with the server.

If an attacker keeps the connection up, steals the certificate, and prevents the client from requesting a new certificate, the certificate authority (CA) will detect this and prevent the attack by revoking the current certificate. The server will detect that the connection is up, and that the client could have and should have requested a new certificate. The client, however, has not requested the certificate (because the attacker is blocking the certificate request). The server hence can see that no request has come through in the revocation time period, and as such revokes the client's certificate.

FIG. 1 shows a simplified network-based communication system 100 where two entities are connected over a channel secured by conventional asymmetric encryption techniques. In the exemplary network-based communication system 100 of FIG. 1, a Transport Layer Security (TLS) server 115 having a public IP address on a private cloud 110 is communicating with a client 125 executing, for example, on a Virtual Machine 120 on the public cloud. The credentials for the Client 125 are optionally assigned by a third party, such as a certificate authority (CA) 150.

As shown in FIG. 1, during step 160, the CA certificate is provided to server 115 by the CA 150, resulting in the server 115 trusting any certificate issues by this CA 150. In addition, during step 170, the CA 150 issues a certificate to the client 125 to be used for authenticated communications with the server 115.

During step 180, the client 125 connects to the server 115 and provides the issued certificate to the server 115 as part of a TLS handshake to authenticate the client 125 to the server 115. In the event of a disconnection, the client 125 can reconnect to the server 115 by providing the issued certificate to the server 115 as part of another TLS handshake to authenticate the client 125 to the server 115.

Figure 2:
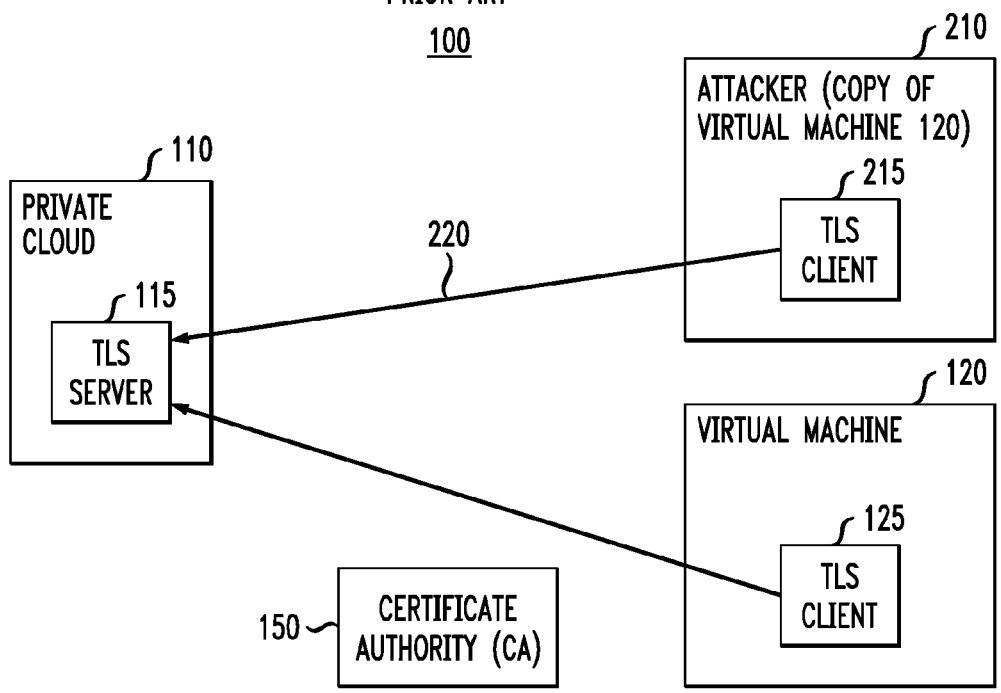
FIG. 2 shows the simplified network-based communication system of FIG. 1 where an attacker has obtained credentials from the exemplary virtual machine.

FIG. 2 shows the same simplified network-based communication system 100 of FIG. 1 where an attacker 210 has obtained a copy of Virtual Machine 120 and now has access to the certificate issued by the CA 150 and the associated private key, both obtained from the Virtual Machine 120. The attacker 210 can then impersonate the client 125 using a client 215.

Under a conventional asymmetric encryption scheme, the certificate of the client 125 remains valid for a long period of time (e.g., on the order of one year). In addition, the server 115 trusts the certificate of the client 125 because the certificate was issued by the CA 150 that is trusted by the client 125, and the certificate appears valid.

Thus, if an attacker 210 obtains the certificate of the client 125 and the corresponding private key associated with the certificate, the attacker 210 can imitate the client 125.

The server could ensure that there is only one active connection at a time using a given client certificate. This would not stop an attacker 210 from disrupting the connection between the client 125 and the server 115, however, and then establishing a new connection with the server 115.

Figure 3:
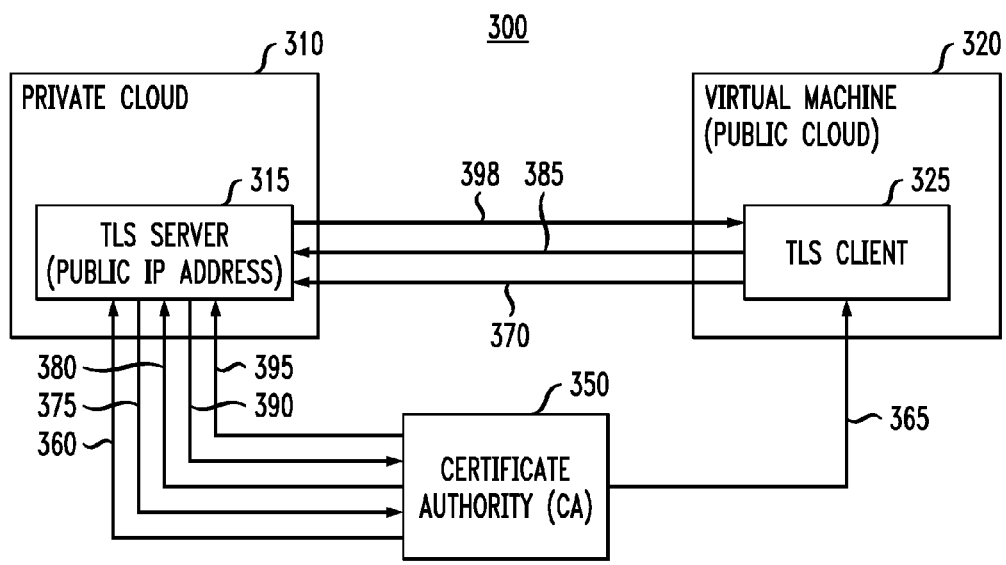
FIG. 3 shows a simplified exemplary network-based communication system that will be used to illustrate the secure asymmetric encryption techniques of the invention.

FIG. 3 shows a simplified exemplary network-based communication system 300 that will be used to illustrate the secure asymmetric encryption techniques of the invention. The exemplary system 300 includes a TLS server 315 having a public IP address on a private cloud 310 communicating with a TLS client 325 executing, for example, on a Virtual Machine 320 on the public cloud, in a similar manner to FIG. 1. The credentials for the client 325 are optionally assigned by a third party, such as a certificate authority (CA) 350.

Although only a single client 325 is shown in FIG. 3, it is expected that a practical implementation of the system 300 will support a substantially larger number of clients. Similarly, although only a single server 315 is shown in FIG. 3, a system 300 in accordance with the invention may include many servers, as well as other arrangements of servers. The invention is therefore not restricted as to the particular number of client or server devices.

The client 325 may represent a lightweight device, such as a mobile telephone, PDA, game console, etc. The client 325 may alternatively represent a desktop or laptop personal computer (PC), a microcomputer, a workstation, a mainframe computer, a wired telephone, a facsimile machine, a television set top box, or any other information processing device that can benefit from the secure asymmetric encryption techniques of the invention. The client 325 may therefore also be implemented as a server. In other words, the invention, although particularly well-suited for use in applications in which roaming lightweight client devices or other client devices authenticate themselves to servers, can be used for secure asymmetric encryption between any type of information processing device, including a device that is itself a server.

The client 325 may also be referred to herein as a user. The term "user" should be understood to encompass either a client device, a person utilizing or otherwise associated with the device, or both. An operation described herein as being performed by a user may therefore be performed by a device, a person utilizing or otherwise associated with the device, or by both the user and the device. Similarly, a password associated with a device may be a password of a user of the device. In this case, the password may be temporarily associated with the device upon entry of the password into the device by the user, as in the case of a device that serves multiple users each having different passwords.

The server 315 may be implemented as an otherwise conventional server, programmed to perform the secure asymmetric encryption functions described herein, or as other types of suitably-programmed information processing devices.

The network may represent a global computer network such as the Internet, a wide area network (WAN), a local area network (LAN), a satellite network, a telephone or cable network, or various portions or combinations of these and other types of networks.

As is apparent from the foregoing, the system 300 as illustrated in FIG. 3 may be viewed more generally as a system having at least two processing devices which are configured to communicate with one another using asymmetric encryption and in which a given one of the devices authenticates itself to the other devices. The particular "client" and "server" labels provided for devices in FIG. 3 should thus be considered as examples only, and not limitations of the invention.

As shown in FIG. 3, during step 360, the CA certificate is provided to server 315 by the CA 350, resulting in the server 315 trusting any certificate issued by this CA 350. In addition, during step 365, the CA 350 issues a certificate having a predefined validity period to the client 325 to be used for authenticated communications with the server 315.

During step 370, the client 325 connects to the Server 315 and provides the issued certificate having a predefined validity period to the server 315 as part of a TLS handshake to authenticate the client 325 to the server 315. During step 375, the server 315 requests a revocation status of the client certificate having a predefined validity period from the CA 350. The CA 350 notifies the server 315 during step 380 that the certificate has not been revoked. During step 385, the server 315 accepts the TLS connection from the client 325.

On a regular basis, the server 315 performs the following actions during step 390 if there is a connection between the server 315 and the client 325:

generates a new key pair (a private key and public key) for the client 325;

indicates to the CA 350 that the a new certificate having a predefined validity period should be generated for the client 325; and indicates that the current certificate having a predefined validity period should be revoked.

During step 395, the CA 350 generates a new client certificate and provides the new client certificate to the server 315. During step 398, the server 315 sends the newly generated private key and new client certificate to the client 325. The client 325 uses this new private key and certificate in future TLS handshakes.

Figure 4:
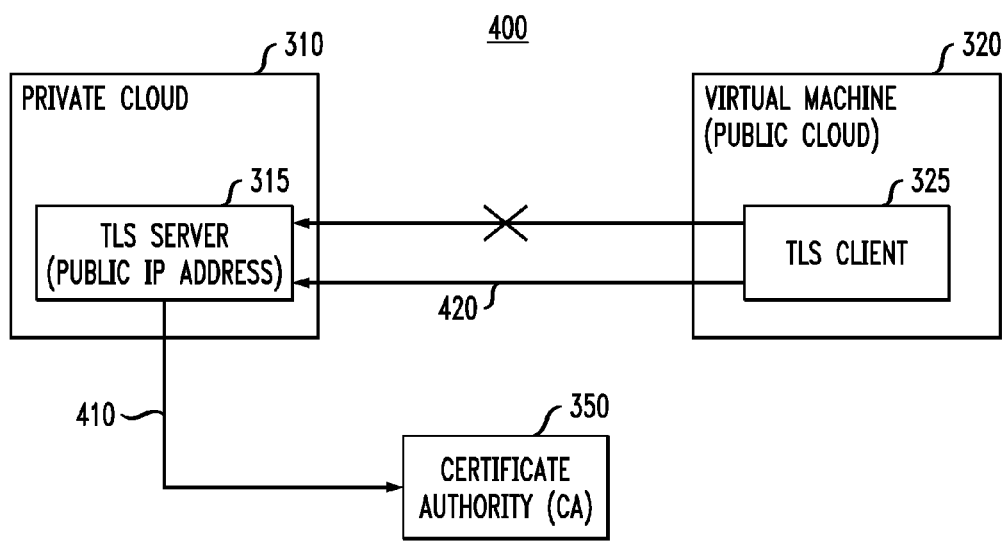
FIG. 4 illustrates the same exemplary network-based communication system of FIG. 3 in the event of a lost connection between the server and the client.

FIG. 4 illustrates the same exemplary network-based communication system 300 of FIG. 3 in the event of a lost connection 400 between the server 315 and the client 325. In the event of such a disconnection between the client 325 and the server 315, the server 315 stops requesting (i) the revocation of the current certificate; and (ii) the generation of a new certificate having a predefined validity period (that have been performed by the server 315 on a regular basis during step 390).

If the connection loss between the server 315 and the client 325 has not exceeded the validity period of the certificate, then the client 325 can re-connect to server 315 during step 420 by providing the latest certificate to the server 315 as part of a TLS handshake to authenticate the client 325 to the server 315.

Figure 5:
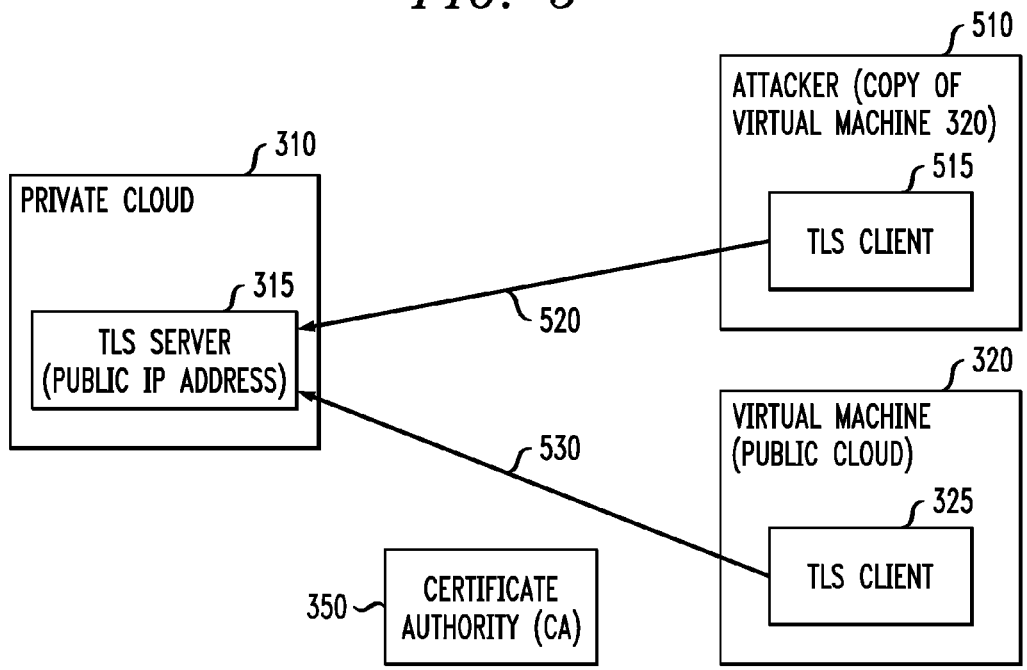
FIG. 5 illustrates the same exemplary network-based communication system of FIG. 3 in the event of an attack.

FIG. 5 illustrates the same exemplary network-based communication system 300 of FIG. 3 in the event of an attack. As shown in FIG. 5, an attacker 510 has obtained a copy of Virtual Machine 320 and now has access to the certificate issued by the CA 350 and the associated private key, both obtained from the Virtual Machine 320. The attacker 510 can then attempt to impersonate the client 325 using a client 515 over a connection 520. If the server 315 determines during step 390 that the connection 530 between the valid client 325 and the server 315 is still up, the server 315 will revoke the certificate of the client 325 during step 390. The certificate copy that the attacker 510 has obtained is also thereby revoked. Thus, the server 315 will refuse the connection 520.

Figure 6:
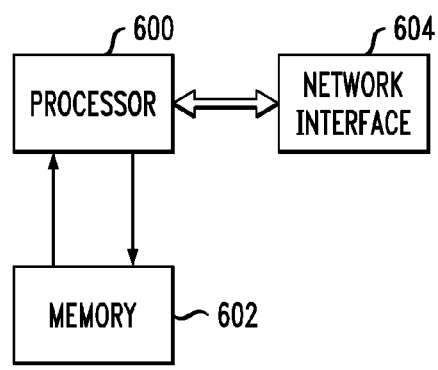
FIG. 6 shows one possible implementation of a given one of the processing devices that implement the server and/or the client of FIGS. 3-5.

FIG. 6 shows one possible implementation of a given one of the processing devices that implement the server 315 and/or the client 325 of FIGS. 3-5. The device in this implementation includes a processor 600 coupled to a memory 602 and a network interface 604. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 602 and executed by the corresponding processor 600. The memory 602 is also used for storing information used to perform computations or other operations associated with the secure authentication protocols of the invention.

As mentioned previously herein, the above-described embodiments of the invention are presented by way of illustrative example only. Numerous variations and other alternative embodiments may be used. For example, while the invention has been illustrated using devices connected to public and private clouds, the invention may be extended into any communication settings where a connection between two devices is protected using an asymmetric encryption scheme. In addition, while the exemplary servers and clients are implemented using TLS servers and TLS clients, respectively, the invention may be extended to any setting where a connection between two devices/entities is protected using an asymmetric encryption scheme.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide an improved asymmetric encryption scheme. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular asymmetric encryption techniques described above are provided by way of illustration, and should not be construed as limiting the present invention to any specific embodiment or group of embodiments. Also, the particular configuration of system elements shown in FIGS. 3-5, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for securing communications between two devices, the method comprising the steps of:

obtaining an expiring revocable certificate having a validity period determined based on one or more of (i) a longest expected connection drop-out duration, and (ii) an expected time for an attacker to obtain said expiring revocable certificate and use said expiring revocable certificate to establish another connection; and securing communications between said two devices on at least one communication channel with said expiring revocable certificate using asymmetric encryption.

2. The method of claim 1, wherein said expiring revocable certificate comprises a public-key infrastructure certificate.

3. The method of claim 1, wherein said validity period comprises a predefined validity period.

4. The method of claim 1, wherein at least one of said devices is on a Public Cloud.

5. The method of claim 1, wherein a prior one of said expiring revocable certificates is revoked when a new expiring revocable certificate is issued to at least one of said devices.

6. The method of claim 1, wherein said expiring revocable certificate remains valid for a predefined validity period if a connection between said two devices is lost.

7. The method of claim 1, wherein at least one of said devices requests a new expiring revocable certificate at least once for each predefined revocation period.

8. The method of claim 7, wherein said expiring revocable certificate is revoked after said predefined revocation period.

9. The method of claim 7, wherein said expiring revocable certificate is revoked after said predefined revocation period only if a connection between said two devices is maintained.

10. The method of claim 1, wherein the method is implemented by one or more of a hardware circuit and an integrated circuit.

11. A computer program product comprising a tangible machine-readable recordable storage medium having encoded therein executable code of one or more software programs, wherein the one or more software programs when executed by the processor of the processing device implement the steps of the method of claim 1.

12. An apparatus for securing communications between two devices, the apparatus comprising:
a memory; and
at least one hardware device, coupled to the memory, operative to:
obtain an expiring revocable certificate having a validity period determined based on one or more of (i) a longest expected connection drop-out duration, and (ii) an expected time for an attacker to obtain said expiring revocable certificate and use said expiring revocable certificate to establish another connection; and
secure communications between said two devices on at least one communication channel with said expiring revocable certificate using asymmetric encryption.

13. The apparatus of claim 12, wherein said expiring revocable certificate comprises a public-key infrastructure certificate.

14. The apparatus of claim 12, wherein said validity period comprises a predefined validity period.

15. The apparatus of claim 12, wherein at least one of said devices is on a Public Cloud.

16. The apparatus of claim 12, wherein a prior one of said expiring revocable certificates is revoked when a new expiring revocable certificate is issued to at least one of said devices.

17. The apparatus of claim 12, wherein said expiring revocable certificate remains valid for a predefined validity period if a connection between said two devices is lost.

18. The apparatus of claim 12, wherein at least one of said devices requests a new expiring revocable certificate at least once for each predefined revocation period.

19. The apparatus of claim 18, wherein said expiring revocable certificate is revoked after said predefined revocation period.

20. The apparatus of claim 18, wherein said expiring revocable certificate is revoked after said predefined revocation period only if a connection between said two devices is maintained.

* * * * *